(12) United States Patent
Nakada et al.

(10) Patent No.: US 8,457,369 B2
(45) Date of Patent: Jun. 4, 2013

(54) FINGER/PALM-PRINT IMAGE PROCESSING APPARATUS, FINGER/PALM-PRINT IMAGE PROCESSING METHOD, AND RECORDING MEDIUM IN WHICH FINGER/PALM-PRINT IMAGE PROCESSING PROGRAM HAS BEEN RECORDED

(75) Inventors: Satoshi Nakada, Tokyo (JP); Yuji Horiba, Aichi (JP); Masanori Kondo, Aichi (JP); Akira Kanayama, Aichi (JP)

(73) Assignees: NEC Corporation, Tokyo (JP); NEC Software Chubu, Ltd., Aichi (JP)

( * ) Notice: Subject to any disclaimer, the term of this patent is extended or adjusted under 35 U.S.C. 154(b) by 83 days.

(21) Appl. No.: 13/133,712

(22) PCT Filed: Dec. 22, 2009

(86) PCT No.: PCT/JP2009/071348
§ 371 (c)(1),
(2), (4) Date: Jun. 9, 2011

(87) PCT Pub. No.: WO2010/074096
PCT Pub. Date: Jul. 1, 2010

(65) Prior Publication Data
US 2011/0249873 A1    Oct. 13, 2011

(30) Foreign Application Priority Data

Dec. 22, 2008 (JP) ................................. 2008-325120

(51) Int. Cl.
*G06K 9/00* (2006.01)
(52) U.S. Cl.
USPC .......................................... 382/124; 382/116
(58) Field of Classification Search
None
See application file for complete search history.

(56) References Cited

U.S. PATENT DOCUMENTS

| | | | | |
|---|---|---|---|---|
| 4,229,023 A * | 10/1980 | Luz | ................................. | 283/77 |
| 4,752,966 A * | 6/1988 | Schiller | ........................ | 382/125 |
| 5,020,112 A * | 5/1991 | Chou | ............................ | 382/226 |
| 5,040,223 A * | 8/1991 | Kamiya et al. | ................ | 382/127 |
| 5,337,369 A * | 8/1994 | Shibuya | ........................ | 382/125 |
| 5,465,303 A * | 11/1995 | Levison et al. | ............... | 382/124 |
| 5,811,366 A * | 9/1998 | Chikami | ....................... | 503/201 |
| 7,333,963 B2 * | 2/2008 | Widrow et al. | ................. | 706/18 |
| 7,702,599 B2 * | 4/2010 | Widrow | ......................... | 706/26 |

FOREIGN PATENT DOCUMENTS

| | | |
|---|---|---|
| JP | 2002222424 A | 8/2002 |
| JP | 2005352623 A | 12/2005 |
| JP | 2007226746 A | 9/2007 |
| JP | 2008217307 A | 9/2008 |

OTHER PUBLICATIONS

International Search Report for PCT/JP2009/071348 mailed Feb. 2, 2010.

* cited by examiner

*Primary Examiner* — Manav Seth

(57) ABSTRACT

A finger/palm-print image processing apparatus comprises: an image converting means that converts finger/palm-print images to conversion images consisting of first and second sets of elements; and an area detecting means that detects, from the conversion images as converted by the image converting means, an area where the number of the first set of elements is equal to or greater than a predetermined number. The first and second sets of elements herein are the elements of sets each of which consists of elements of the finger/palm-print images. The first set of elements have those degrees of change in color information which meet a predetermined criterion, while the second set of elements have those degrees of change in color information which do not meet the predetermined criterion.

7 Claims, 11 Drawing Sheets

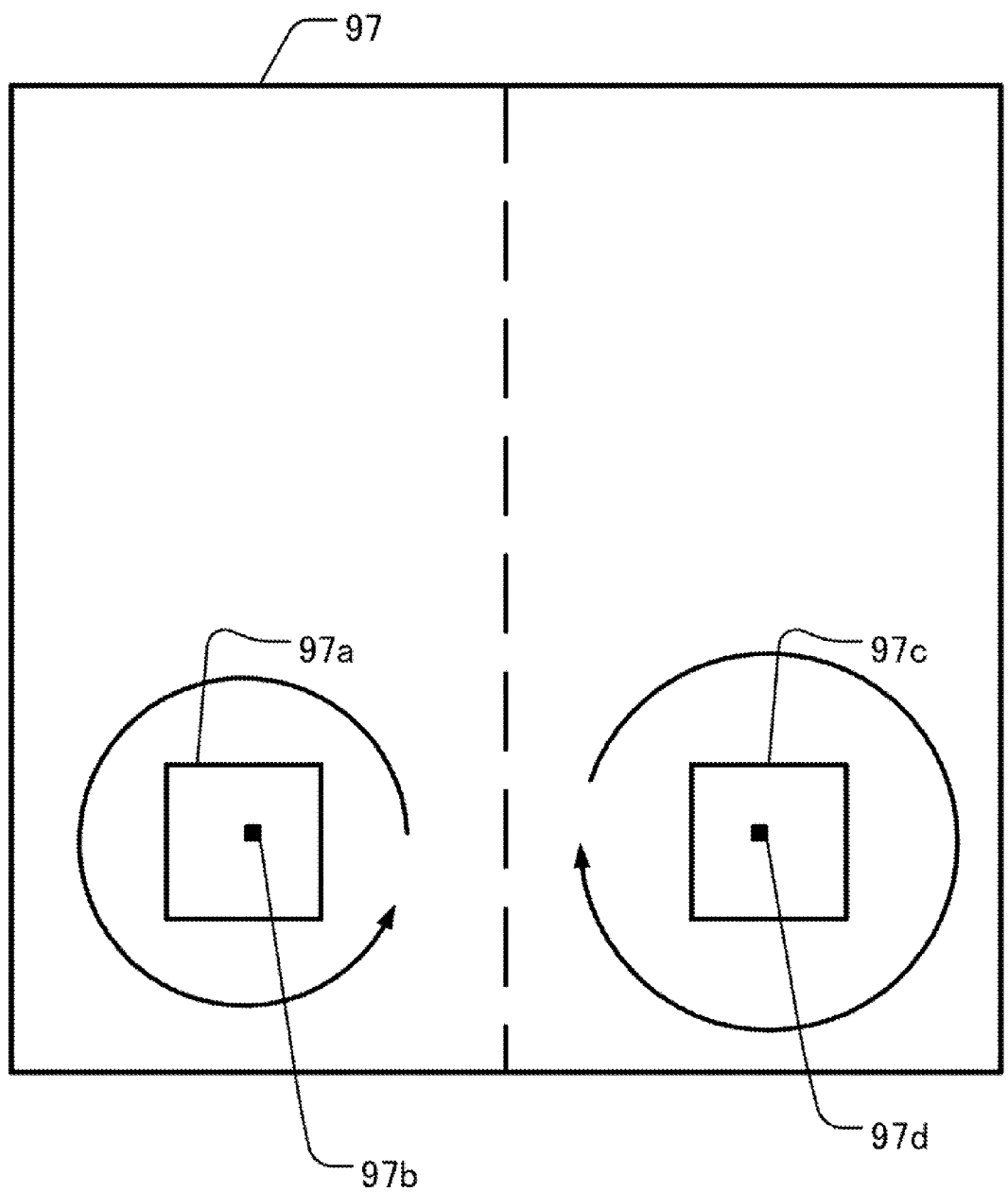

FINGER/PALM-PRINT IMAGE PROCESSING APPARATUS, FINGER/PALM-PRINT IMAGE PROCESSING METHOD, AND RECORDING MEDIUM IN WHICH FINGER/PALM-PRINT IMAGE PROCESSING PROGRAM HAS BEEN RECORDED

TECHNICAL FIELD

The present invention relates to a finger/palm-print image processing apparatus for processing finger/palm-print images that are images of finger/palm-prints, a finger/palm-print processing method and a computer-readable recording medium on which a finger/palm-print processing program has been recorded.

BACKGROUND ART

Development of biometric authentication technology, which accomplishes authentication using the subject's body characteristics in place of codes or passwords composed of combinations of text and symbols, has flourished in recent years. In general, biometric authentication uses body characteristics that differ from individual to individual, such as finger prints, the vein pattern on the back of the hand, the iris pattern in the eye, voice print or the like (for example, see Patent Literature 1).

PRIOR ART LITERATURE

Patent Literature

Patent Literature 1: Unexamined Japanese Patent Application KOKAI Publication No. 2008-217307.

DISCLOSURE OF INVENTION

Problems to be Solved by the Invention

For example, in Patent Literature 1 technology is disclosed for extracting an image of a palm-print for use in authentication from palm image data. This technology determines in advance which portion of the palm image will be used in authentication, and extracts an image corresponding thereto from a photographed image.

However, there are cases in which areas not suitable for comparison are included in the palm image, depending on conditions at the time of photography and the individual body characteristics. In such cases, if the areas used in authentication are determined in advance, palm-print images not suitable for comparison are extracted.

In consideration of the foregoing, it is an object of the present invention to extract palm-print images suitable for authentication.

Means for Solving the Problem

A finger/palm-print image processing apparatus according to a first aspect of the present invention is a finger/palm-print image processing apparatus for processing a finger/palm-print images that are images of finger/palm-prints, and comprises:

an image converting means for converting the finger/palm-print image into a converted image composed of a first set of elements and a second set of elements; and a region detecting means for detecting regions where the number of the first set of elements is at least a prescribed number, from within the converted image converted by the image converting means;

wherein the first set of elements and the second set of elements are sets of elements in which elements of the finger/palm-print image have been gathered;

the first set of elements is a set of elements in which color information for the elements in the set of elements satisfy a predetermined criterion; and the second set of elements is a set of elements in which color information for the elements in the set of elements do not satisfy a predetermined criterion.

A finger/palm-print image processing method according to a second aspect of the present invention is a finger/palm-print image processing method for processing a finger/palm-print image that is an image of a finger/palm-print, and comprises:

an image converting step for converting the finger/palm-print image into a converted image composed of a first set of elements and a second set of elements; and a region detecting step for detecting regions where the number of the first set of elements is at least a prescribed number, from within the converted image converted by the image converting step;

wherein the first set of elements and the second set of elements are sets of elements in which elements of the finger/palm-print image have been gathered;

the first set of elements is a set of elements in which color information for the elements in the set of elements satisfy a predetermined criterion; and the second set of elements is a set of elements in which color information for the elements in the set of elements do not satisfy a predetermined criterion.

A recording medium on which is recorded a finger/palm-print image processing program according to a third aspect of the present invention is a finger/palm-print image processing program for accomplishing on a computer a finger/palm-print image processing method for processing a finger/palm-print image that is an image of a finger/palm-print, and comprises:

an image converting step for converting the finger/palm-print image into a converted image composed of a first set of elements and a second set of elements; and a region detecting step for detecting regions where the number of the first set of elements is at least a prescribed number, from within the converted image converted by the image converting step;

wherein the first set of elements and the second set of elements are sets of elements in which elements of the finger/palm-print image have been gathered;

the first set of elements is a set of elements in which color information for the elements in the set of elements satisfy a predetermined criterion; and the second set of elements is a set of elements in which color information for the elements in the set of elements do not satisfy a predetermined criterion.

In the present invention, a finger/palm-print is defined as including at least out of a fingerprint and a palm-print.

In addition, in the present invention a finger/palm-print image is defined as appropriately including, besides an image of a finger/palm-print alone, an image including a finger/palm-print and other regions (for example, regions outside the palm or partial regions between the fingers).

Effect of the Invention

With the present invention, a region suitable for comparison can be detected in a finger/palm-print image.

BRIEF DESCRIPTION OF DRAWINGS

FIG. 10 is a diagram used to explain the region selection sequence by the region detecting unit.

BEST MODE FOR CARRYING OUT THE INVENTION

Figure 1:
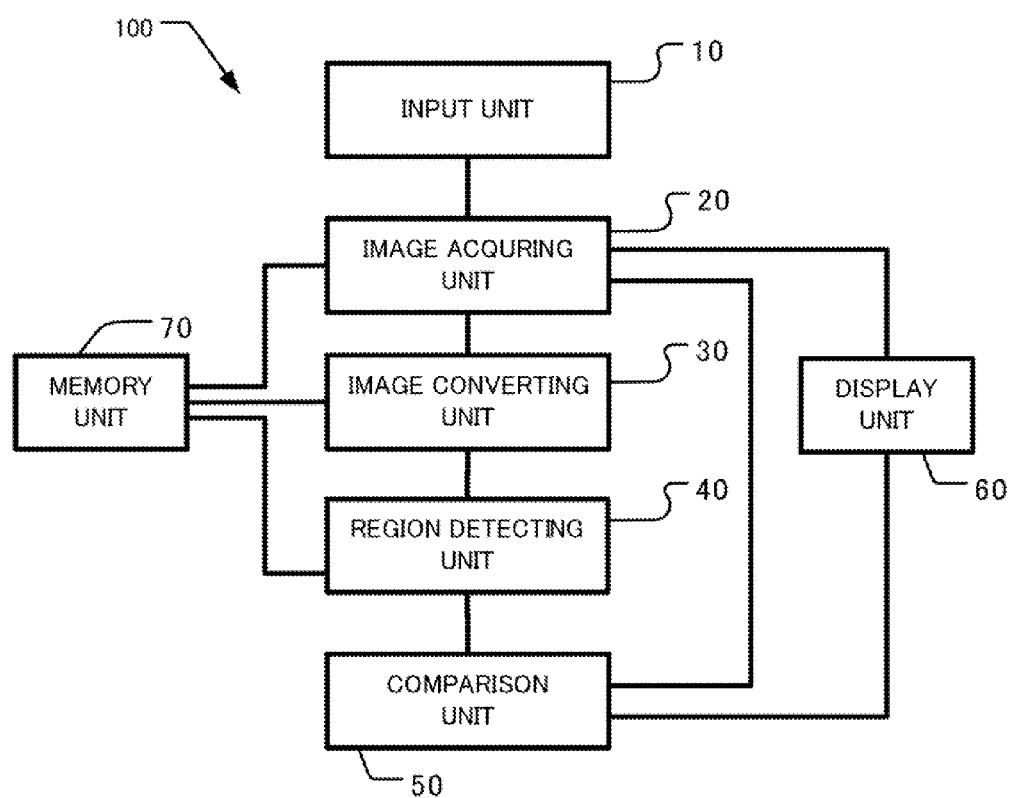
FIG. 1 is a block diagram showing a finger/palm-print image processing apparatus according to the present embodiment.

The preferred embodiment of the present invention is described below with reference to the drawings. FIG. 1 is a block diagram of a finger/palm-print image processing apparatus 100 according to an embodiment of the present invention. The finger/palm-print image processing apparatus 100 is an apparatus for comparing two prerecorded finger/palm-print images thought to be the same individual, and comparing whether the finger/palm-prints of the two finger/palm-print images are those of the same individual.

As shown in FIG. 1, the finger/palm-print image processing apparatus 100 is provided with an input unit 10, an image acquiring unit 20, an image converting unit 30, a region detecting unit 40, a comparison unit 50, a display unit 60 and a memory unit 70.

The input unit 10 includes a keyboard and a pointing device such as a mouse. The input unit 10 is used for example to select two finger/palm-print images the user wants to compare.

The display unit 60 includes a CRT (Cathode Ray Tube) or an LCD (Liquid Crystal Display). This display unit 60 displays for example a screen for selecting two finger/palm-print images the user wants to compare. In addition, the display unit 60 displays the comparison results accomplished by the comparison unit 50.

The memory unit 70 stores finger/palm-print images and various types of information. The finger/palm-print images are for example image data in which finger/palm-print images are shaded. In comparing finger/palm-prints it is possible to use various positions in the finger/palm-prints. Consequently, various types of finger/palm-print images are used in comparing finger/palm-prints. The finger/palm-print images can be acquired using a scanner or the like.

Examples of finger/palm-print images used in comparing finger/palm-prints are as follows:
(1) right full hand
(2) left full hand
(3) right upper palm
(4) left upper palm
(5) right lower palm
(6) left lower palm
(7) right writers
(8) left writers
(9) right fingers (right thumb, right index, right middle, right ring and right little)
(10) left fingers (left thumb, left index, left middle, left ring and left little)
(11) right 4-slap and right slap thumb
(12) left 4-slap and left slap thumb The image acquiring unit 20 causes the finger/palm-print images stored in the memory unit 70 to be displayed on the display unit 60. Furthermore, when two finger/palm-print images are selected from among the screens displayed on the display unit 60 via the input unit 10, the image acquiring unit 20 acquires the two selected finger/palm-print images from the memory unit 70 (see below-described step S101). As one example, suppose that the two finger/palm-print images are the right upper palm image and the right lower palm image thought to be from the same individual.

The image acquiring unit 20 passes one out of the two acquired finger/palm-print images (for example, the right upper palm image) to the image converting unit 30. In addition, the image acquiring unit 20 passes the acquired two finger/palm-print images (for example, the right low palm image) to the comparison unit 50 along with detecting information for detecting which of these two finger/palm-print images was passed to the image converting unit 30. Below, for ease of explanation, one image passed to the image converting unit 30 shall be called the first finger/palm-print image and the other image shall be called the second finger/palm-print image.

The image converting unit 30 converts the first finger/palm-print image acquired from the image acquiring unit 20 and creates a converted image (for a concrete example, see below-described steps S102 and S103). In addition, the image converting unit 30 creates as data relating to the converted image when converting the first finger/palm-print image position information for pixels groups in the first finger/palm-print image comprising a first set of elements corresponding to pixels comprising the converted image. In addition, position information for pixel groups in the first finger/palm-print image comprising a second set of elements corresponding to the image comprising the converted image is created. This position information is information indicating the position of pixel groups in the first finger/palm-print image. The image converting unit 30 passes a converted image linked to the position information to the region detecting unit 40.

The converted image is composed of pixels corresponding to multiple first sets of elements and pixels corresponding to multiple second sets of elements. The first set of elements and the second set of elements are composed of pixel groups comprising the finger/palm-print image. The first set of elements is a set of elements in which the degree of change in color information for pixels comprising the set of elements satisfies a predetermined criterion. In addition, the second set of elements is a set of elements in which the degree of change in color information for pixels comprising the set of elements does not satisfy a predetermined criterion.

A constant threshold value is set as the predetermined criterion. The threshold value can be appropriately determined, but is preferably a threshold value such that the set of elements in which the degree of change in color information is at least as great as the threshold value is a set of elements suitable for comparing the finger/palm-print. Specifically, the threshold value is preferably a value such that the maximum shading value (or maximum gradation) of the pixels comprising the set of elements is two or three times the minimum shading value (or minimum gradation).

The region detecting unit 40 detects regions out of the converted image acquired from the image converting unit 30 in which the number of pixels corresponding to the first set of elements is at least a prescribed number (for a specific example, see below-described S104 through S116). Below, for ease of explanation, a region detected by the region detecting unit shall be called a detected region.

A constant threshold value is set as the specified number. The threshold value can be appropriately determined, but is preferably a threshold value determined such that the detected region is a region suitable for comparing the finger/palm-prints. Specifically, the threshold value can be set to 80% of the number of set elements contained in the detected region, in other words a number found by multiplying by 0.8 the sum of the first set of elements and the second set of elements contained in the detected region.

The region detecting unit 40 detects three or more detected regions, for example, in the converted image. If there are three or more detected regions, it is possible to raise the accuracy of comparison of finger/palm-prints.

The region detecting unit 40, upon detecting the detected regions, creates region detecting information indicating to what regions in the first finger/palm-print image the first set of elements and the second set of elements contained in the detected regions correspond, using the above-described position information.

The first set of elements and the second set of elements are obtained from the finger/palm-print image. Consequently, if it is known in which region of the finger/palm-print image the first set of elements and the second set of elements are contained, it can be known to which region of the finger/palm-print image the detected regions containing these correspond. Hence, the region detecting unit 40 creates region detecting information using the position information. The region detecting unit 40, upon creating the region detecting information, passes this region detecting information to the comparison unit 50. On the other hand, when the region detecting unit 40 cannot detect detected regions, impossibility information indicating that a detected region cannot be detected is passed to the comparison unit 50.

The comparison unit 50 acquires the first finger/palm-print image, the second finger/palm-print image and the detecting information from the image acquiring unit 20. In addition, the comparison unit 50 acquires region detecting information or impossibility information from the region detecting unit 40.

The comparison unit 50 detects that the original data of the converted image is the first finger/palm-print image on the basis of the detecting information. Next, the comparison unit 50 detects regions corresponding to the detected regions in this first finger/palm-print image using the region detecting information. Furthermore, the image of this region is extracted as a comparison image.

The comparison unit 50 compares the comparison image extracted from the first finger/palm-print image with the second finger/palm-print image. This comparison can be accomplished by a method using characteristic points and relations.

When the comparison image is contained in the second finger/palm-print image, the comparison unit 50 determines that the owner of the finger/palm-print of the first finger/palm-print image and the owner of the finger/palm-print of the second finger/palm-print image are the same individual. Furthermore, the determination results are displayed on the display unit 60. On the other hand, when impossibility information is acquired from the region detecting unit 40, the comparison unit 50 displays on the display unit 60 a comparison result indicating that comparison was impossible.

As described above, the finger/palm-print image processing apparatus 100 is provided with the image converting unit 30 for converting the first finger/palm-print image into a converted image composed of a first set of elements and a second set of elements, and a region detecting unit 40 for detecting regions containing pixels corresponding to the first set of elements above a predetermined number from within the converted image converted by the image converting means.

The image converting unit 30 partitions the set of elements comprising the finger/palm-print image (detected regions within the finger/palm-print image) into a first set of elements in which the degree of change in the color information of the element is large and a second set of elements in which the degree of change in the color information is small. Furthermore, the region detecting unit 40 detects regions containing a predetermined number or more of first set elements as detected regions. Through this, the region detecting unit 40 can detect detected regions containing numerous first set elements with a large degree of change in the color information. Hence, it is possible to extract comparison images from the finger/palm-print image as regions corresponding to the detected regions.

The fact that there are numerous first set elements is because there are numerous set elements with a large change in color. Consequently, the comparison image could be called a region in which analysis of the characteristics of the finger/palm-print is easy, such as extracting characteristics points of the finger/palm-print. On the other hand, in regions with small change in color, analysis of the characteristics of the finger/palm-print is difficult.

In addition, as described above, the finger/palm-print image processing apparatus 100 is provided with a comparison unit 50 for comparing comparison images extracted from the first finger/palm-print image with the second finger/palm-print image (for a concrete example, refer to the above explanation or below-described step S117). Through this, it is possible to accurately accomplish comparison of finger/palm-prints. In addition, in the finger/palm-print image processing apparatus 100 comparison of the comparison image extracted from the first finger/palm-print as a comparison target region and the second finger/palm-print is accomplished. Through this, compared to the case of comparing the entire first finger/palm-print image with the entire second finger/palm-print image, the volume of information handled during comparison becomes smaller. As a result, the processing burden in the finger/palm-print image processing apparatus 100 becomes smaller.

In addition, the finger/palm-print image processing apparatus 100 executes a finger/palm-print image processing method. By executing this finger/palm-print image processing method, it is possible to realize the above-described effects.

The color information is information on color possessed by the elements of the finger/palm-print image. The degree of change in the color information is the degree of change in this color. The elements are one or more pixels comprising the finger/palm-print image.

As the color information, there is a shading value. The shading value is a value expressing the shading of each element of the finger/palm-print image. For example, if the shading value is large, the color of that element is dark, and if the shading value is small, the color of that element can be called light. When the set of elements are composed of multiple pixels, the shading value is the average value of the multiple pixels, for example. A gradation is a concrete example of the shading value. When the image is in color, the average value of the gradation of each color (red, blue and green) the pixel possesses is taken as the gradation, for example.

The shading difference is taken as the degree of change in color information. The shading difference is, for example, the difference between the maximum value and the minimum value of the shading value of the pixels comprising the set of elements. The larger this difference, the greater the difference in shading can be said to be between the pixels comprising the set of elements. When the shading difference between pixels contained in the comparison image is large, the characteristics of the finger/palm-print are easy to notice. Conversely, when the shading difference between pixels contained in the comparison image is small, noticing characteristics points and the like becomes difficult, and as a result the accuracy of the comparison declines.

Contrast is a concrete example of the shading difference. Contrast is the difference between the maximum gradation and the minimum gradation in pixels comprising the set of elements. When the set of elements is composed of multiple pixels, the gradation of the set of elements is the average value of the contrast of the pixels comprising that set of elements. The larger the contrast, the greater the difference is in gradations among pixels comprising the set of elements. The larger the contrast, the easier it is to notice characteristics of the finger/palm-print. In addition, the contrast in gradations of elements comprising the set of elements satisfying a predetermined criterion includes the contrast threshold value being at least a predetermined criterion value, and the contrast sensitivity being at least a predetermined criterion value.

Next, one example of a detailed process accomplished by the finger/palm-print image processing apparatus 100 will be simply explained. First, the finger/palm-print image processing apparatus 100 finds the gradations (for example, 256 gradations) for each pixel in a finger/palm-print image (an image with the image of a finger/palm-print shaded) composed of 1024×1024 pixels. After finding the gradations, the finger/palm-print image processing apparatus 100 determines for each 64×64 set of elements composed of 16×16 pixels whether the average of the contrast in the pixels within the set of elements is at least a fixed threshold value. Furthermore, a "1" is appended to set elements in which the contrast is at least the fixed threshold value, and a "0" is appended to set elements in which the contrast is less than the fixed threshold value. Hereafter, set elements to which "1" was appended are called the first set of elements, and set elements to which "0" was appended are called the second set of elements.

Furthermore, the finger/palm-print image processing apparatus 100 creates a converted image composed of pixels corresponding to each of the 64×64 set of elements. This converted image can be thought of as a binary image composed of pixels corresponding to the first set of elements to which "1" was assigned and pixels corresponding to second set of elements to which "0" was assigned.

Next, the finger/palm-print image processing apparatus 100 sets a point inside the converted image. Furthermore, a selected region composed of 16×16 pixels containing this point is selected from within the converted image. The finger/palm-print image processing apparatus 100 detects this region as a detected region if the selected region contains large numbers of pixels to which "1" was assigned. Because the detected region corresponds to the comparison target region, the finger/palm-print image processing apparatus 100 extracts the comparison target region from the finger/palm-print image as a comparison image and uses this in finger/palm-print comparison. On the other hand, if the selection region does not contain numerous pixels to which "1" was assigned, the finger/palm-print image processing apparatus 100 reselects a predetermined number of times the periphery of the selection region initially selected and searches for a region containing large numbers of pixels to which "1" was assigned.

Figure 2:
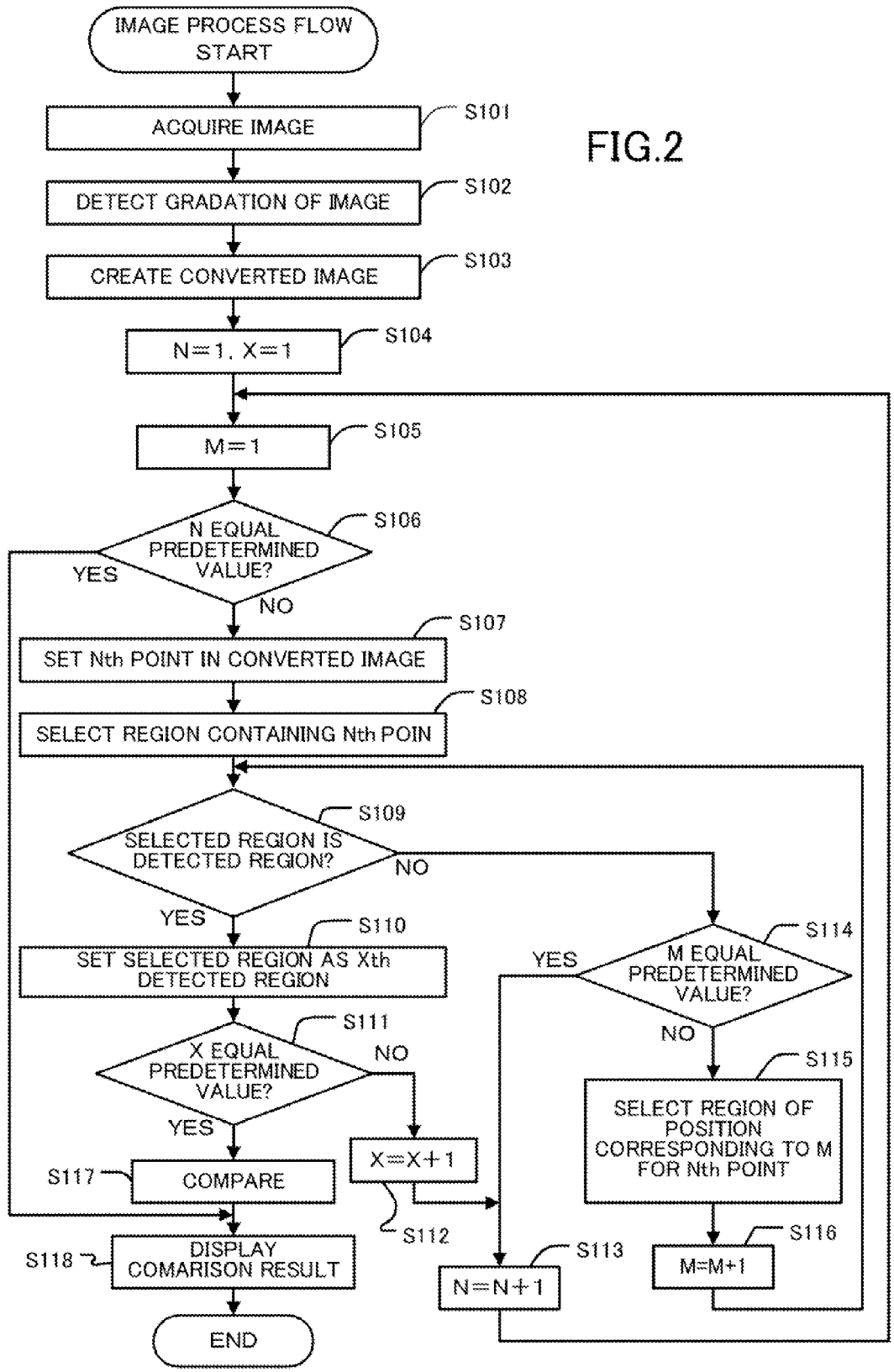
FIG. 2 is a diagram showing the image processing flow accomplished by a finger/palm-print image processing apparatus.
Figure 3A:
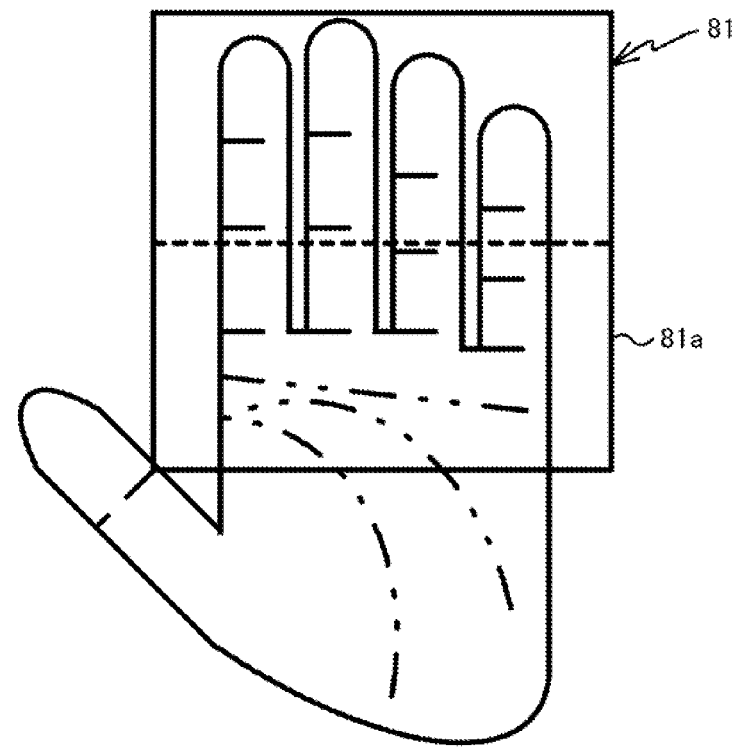
FIG. 3A is a diagram showing an image of a right upper palm.
Figure 3B:
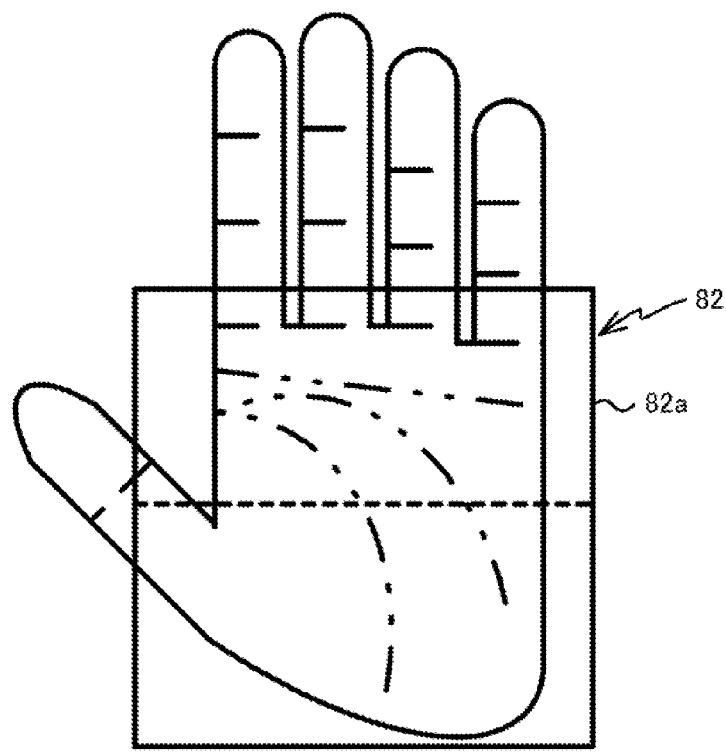
FIG. 3B is a diagram showing an image of a right lower palm.

In addition, the finger/palm-print image processing apparatus 100, having detected a detected region or being unable to detect a detected region despite reselection a predetermined number of times, searches for a region containing large numbers of pixels to which "1" was assigned using the same method as described above by setting another point within the converted image. In this manner, the finger/palm-print image processing apparatus 100 detects three or more detected regions Next, an example of the detailed process accomplished by the finger/palm-print image processing apparatus 100 is explained with reference to FIG. 2. FIG. 2 is a flowchart showing the process executed by the finger/palm-print image processing apparatus 100. In addition, FIG. 3A shows a first finger/palm-print image 81 that is a right upper palm image. FIG. 3B shows a second finger/palm-print image 82 that is a right lower palm image.

First, the image acquiring unit 20 acquires from the memory unit 70 the first finger/palm-print image and the second finger/palm-print image selected by the user (step S101). Suppose that the owner detected by the owner detecting information of the first finger/palm-print image and the owner detected by the owner detecting information of the second finger/palm-print image are the same individual.

The image acquiring unit 20 selects the first finger/palm-print image 81 from between the first finger/palm-print image 81 and the second finger/palm-print image 82. In addition, the image acquiring unit 20 detects areas that overlap between the first finger/palm-print image 81 and the second finger/palm-print image 82. Furthermore, overlapping area detecting information as a specification result is linked to the selected first finger/palm-print image 81.

The overlapping area detecting information is generated as below by the image acquiring unit 20. The memory unit 70 stores first information containing type detecting information for the first finger/palm-print image 81 and first overlap detecting information detecting which part of the first finger/palm-print image 81 overlaps the second finger/palm-print image 82. In addition, this unit stores second information containing type detecting information for the second finger/palm-print image 82 and second overlap detecting information detecting which part of the second finger/palm-print image 82 overlaps the first finger/palm-print image 81, linking this to the first information.

The overlap detecting information can be predicted to a certain degree by the combination of finger/palm-print images. Consequently, detecting information for detecting an area 81a occupying the upper half of the first finger/palm-print image 81 and detecting information for detecting an area 82a occupying the lower half of the second finger/palm-print image 82, where the first finger/palm-print image 81 and the second finger/palm-print image 82 overlap, can be stored in advance in the memory unit 70.

Depending on the finger/palm-print image acquiring method or the like, it is conceivable that the position of the finger/palm-print may be shifted somewhat between the first finger/palm-print image 81 and the second finger/palm-print image 82. Consequently, it is preferable for the areas 81a and 82b detected by the first overlap detecting information or the second overlap detecting information to assume a region that is large to a certain degree. As can be seen by referring to FIG. 3A or FIG. 3B, in the present embodiment the areas 81a and 82a are regions that are roughly half of the finger/palm-print image.

The image acquiring unit 20 acquires from the memory unit 70 mutually corresponding first information and second information, the key being type detecting information related to the first finger/palm-print image 81 and the second finger/palm-print image 82. Furthermore, the image acquiring unit 20 extracts the first overlap detecting information from the first information related to the first finger/palm-print image 81 and makes this first overlap detecting information overlap area detecting information.

For example, the first finger/palm-print image 81 is a right upper palm image. In this case, the type detecting information contained in the first information is information indicating that the first finger/palm-print image 81 is the right upper palm. Furthermore, the first overlap detecting information is information for detecting the lower half region in the first finger/palm-print image 81. The image acquiring unit 20 links the first overlap detecting information to the selected first finger/palm-print image 81 as overlap area detecting information. Furthermore, this first finger/palm-print image 81 is passed to the image converting unit 30.

The image converting unit 30 detects the gradations of the pixels comprising the first finger/palm-print image (step S102).

For example, the first finger/palm-print image 81 and the second finger/palm-print image 82 are composed of pixels arranged in a matrix array with 1,024 rows and 1,024 columns. The image converting unit 30 detects the gradations (for example, 256 gradations) for each pixel using the color of each pixel (here, the shading).

The image converting unit 30 creates gradation information (image gradation information) for each pixel. The image gradation information contains information showing the gradation and position in the finger/palm-print image of each pixel, owner detecting information for the first finger/palm-print image 81, type detecting information for the first finger/palm-print image 81 and overlap area detecting information.

Figure 4:
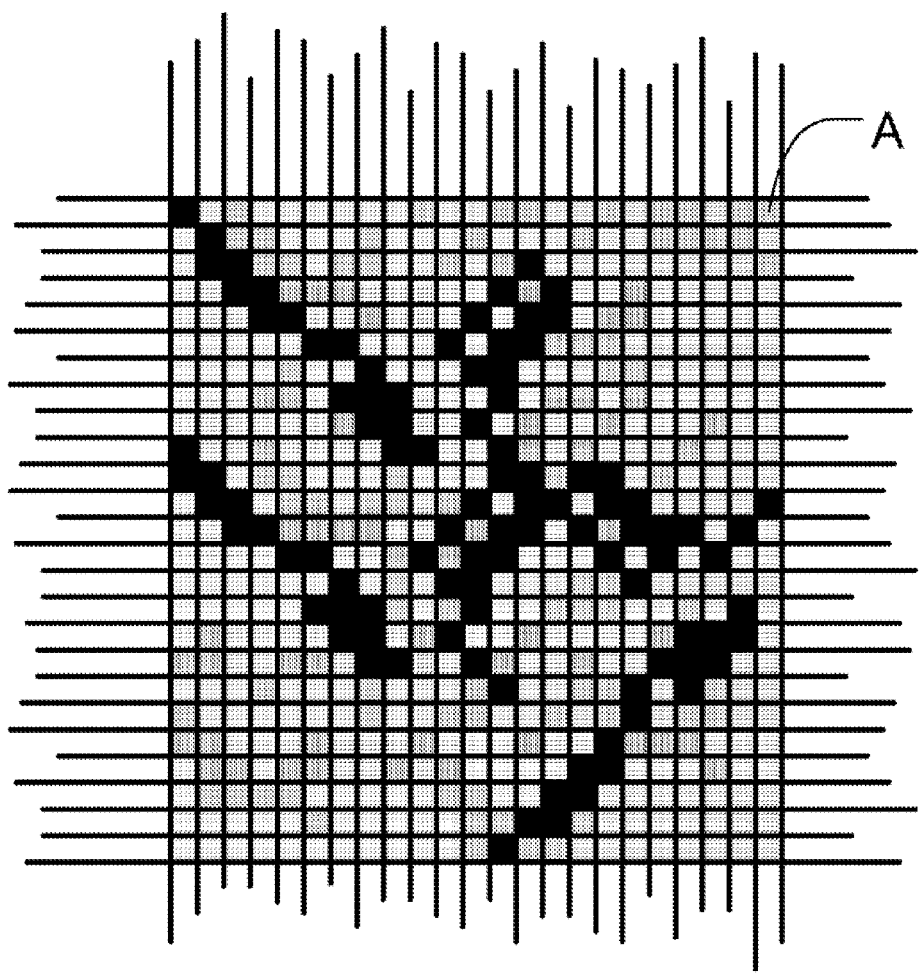
FIG. 4 is a diagram showing the state of pixels in a portion of a finger/palm-print.

FIG. 4 shows the condition of a portion of the pixels in a finger/palm-print image. As can be seen by referring to FIG. 4, the pixel A has color (here, shading). The image converting unit 30 creates a converted image on the basis of the gradation (image gradation information) detected (step S103). Specifically, the image converting unit 30 partitions the first finger/palm-print image 81 into 64×64 regions composed of 16×16 pixels. Furthermore, the contrast of the pixels in each partition is detected. Below, the pixel groups contained in each partition are called sets of elements.

Figure 5:
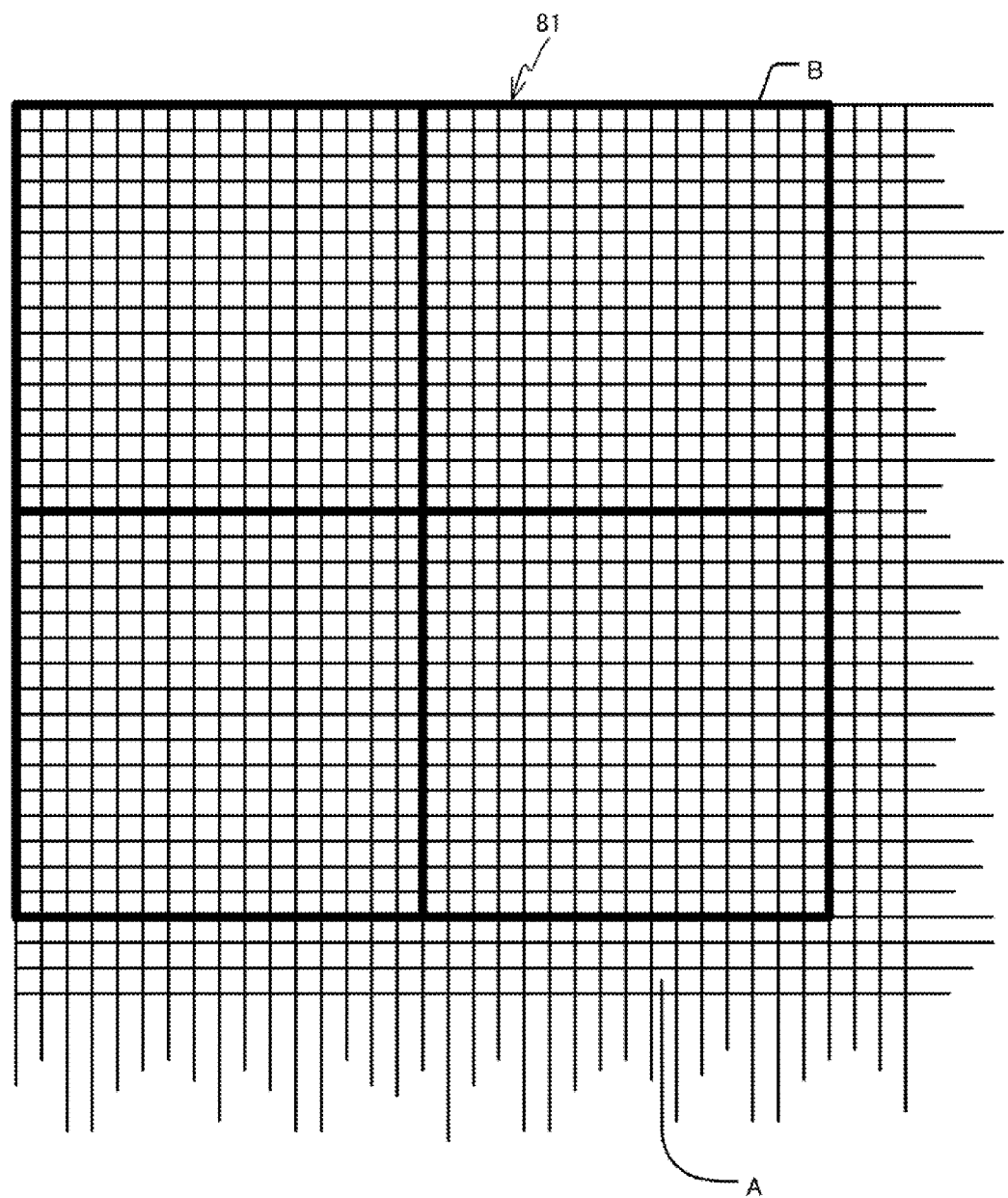
FIG. 5 is a diagram showing an example of a portion of 1024×1024 pixels A (upper left) partitioned by 16×16 set of elements B.

FIG. 5 shows a portion (upper left part) of the first finger/palm-print image 81. As can be seen by referring to FIG. 5, each set of elements B is composed of pixels arranged in a matrix shape with 16 rows and 16 columns.

Figure 6:
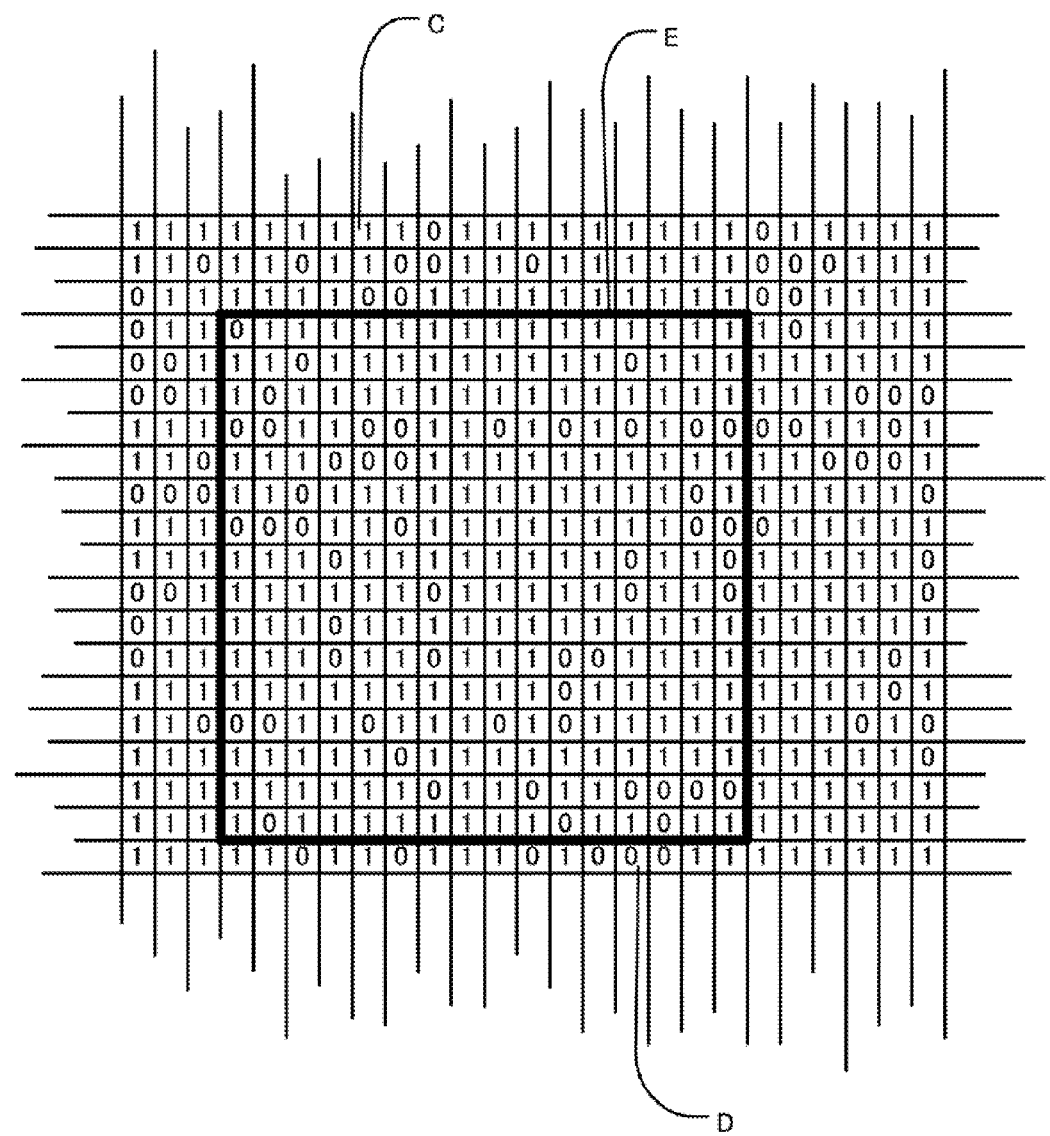
FIG. 6 is a diagram showing one example of a portion of a converted image.

The image converting unit 30 appends a "1" to set elements with a contrast at least as great as a threshold value in each set of elements B. In addition, a "0" is assigned to set elements with a contrast less than the threshold value in each set of elements B. Furthermore, the finger/palm-print image processing apparatus 100 creates a converted image composed of 64×64 pixels corresponding to each set of element. FIG. 6 shows a portion of a converted image. As shown in FIG. 6, the converted image is an image composed of pixels C indicated by "1" and pixels D indicated by "0".

Next, the image converting unit 30 detects the region used in comparison from within the first finger/palm-print image 81 using the overlap area detecting information. For example, the image converting unit 30 detects the area 81a overlapping the second finger/palm-print image 82 from the first finger/palm-print image 81 on the basis of the overlap area detecting information.

Next, the image converting unit 30 passes the converted image to the region detecting unit 40. The region detecting unit 40 acquires the converted image from the image converting unit 30.

The region detecting unit 40 detects an initial value 1 (N=1, X=1) for N and X as counter values for the acquired converted image (step S104). Furthermore, the region detecting unit 40 sets an initial value 1 (M=1) for M as a counter value for the acquired converted image (step S105).

Next, the region detecting unit 40 determines whether N is a prescribed value (step S106). N becomes the prescribed value (step S106: Yes) when there is no below-described point for finding a detected region, and when the necessary number of detected regions cannot be detected. In this case, the region detecting unit 40 proceeds to step S118. At this time, the region detecting unit 40 creates information indicating specification impossibility and passes this to the comparison unit 50.

Here, assume that the prescribed value is 4. Accordingly, if N is 4, the determination in step S106 is affirmed. In addition, if N is less than 4, the determination in step S106 is negative, and the region detecting unit 40 executes the process of step S107.

Next, the region detecting unit 40 sets the Nth point inside the converted image (step S107). The region detecting unit 40 sets this point based on the overlap area detecting information, for example. Specifically, a point is set at a predetermined position of the area detected by the overlap area detecting information.

More specifically, in a state in which the type detecting information, the overlap area detecting information and the point detecting information detecting the position of the point are made to mutually correspond, this can be recorded in advance in the memory unit 70. The region detecting unit 40 acquires point detecting information from the memory unit 70 with the type detecting information and overlap area detecting information of the converted image as a key. Furthermore, the point is set based on this point detecting information. As can be seen by referencing FIG. 7, the first point is the point 91*a*, the second point is the point 91*b* and the third point is the point 91*c*. In this manner, by the region detecting unit 40 setting points, the region detecting unit 40 can efficiently detect detected regions.

Figure 7:
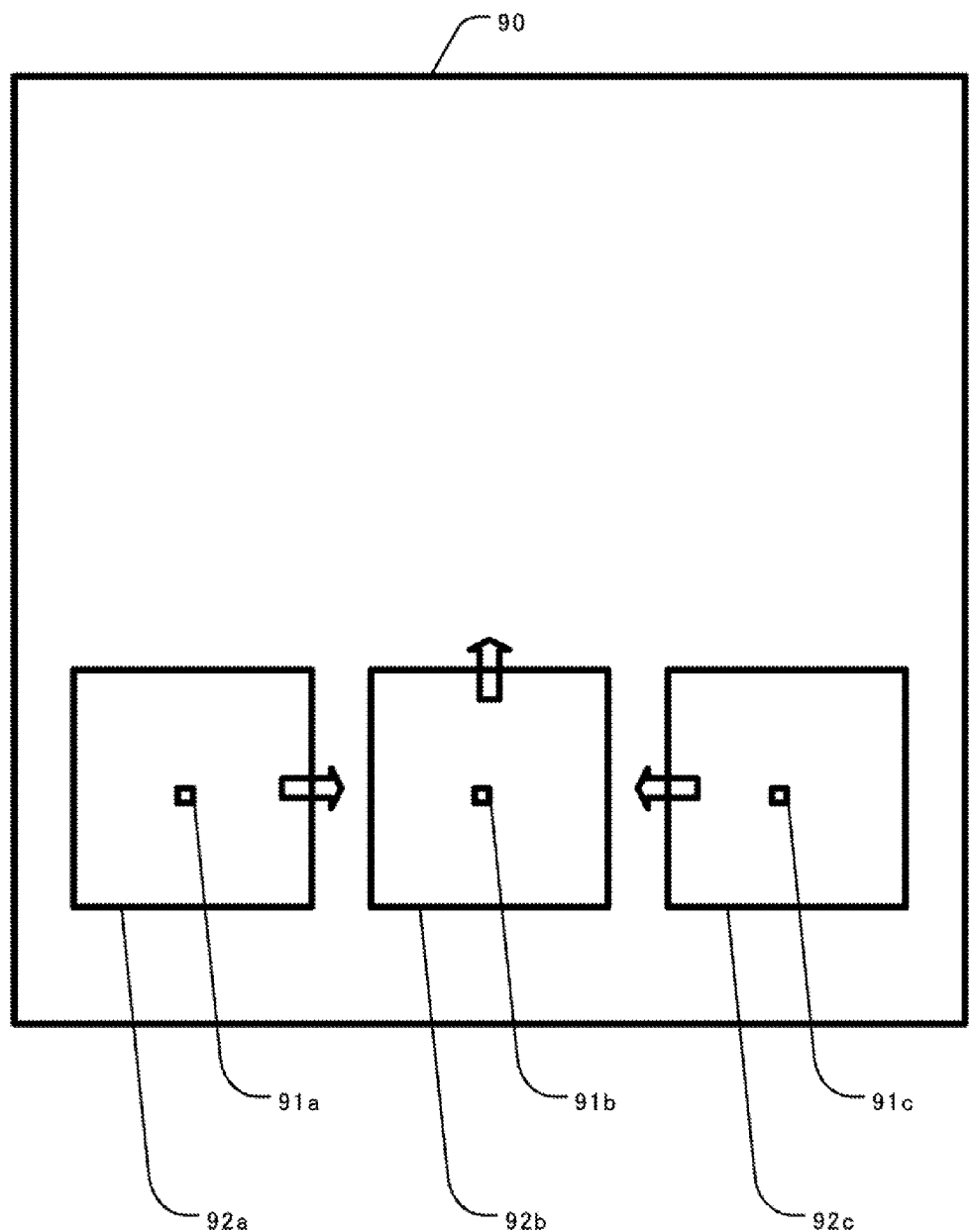
FIG. 7 is a diagram used to explain the position of multiple points set inside the converted image, and multiple selected regions selected so as to include these points.

FIG. 7 is a drawing used to explain the position of multiple points set within the converted image, and multiple selected regions selected so as to contain these points. The converted image 90 is composed of 64×64 pixels. In addition, the points 91*a*, 91*b*, and 91*c* are set on any pixel. Furthermore, the selection regions 92*a*, 92*b* and 92*c* are each composed of 16×16 pixels, with the center of each roughly coinciding with the points 91*a*, 91*b* and 91*c*.

The multiple points may be uniformly scattered within the converted image, but as shown in FIG. 7, it is preferable that these be set within a prescribed range inside the converted image 90. For example, when comparing the first finger/palm-print image 81 and the second finger/palm-print image, it is preferable to set the points 91*a*, 91 and 91*c* within the region in the converted image.

Here, the area 81*a* of the first finger/palm-print image 81 overlaps the area 82*a* of the second finger/palm-print image 82. Consequently, it is preferable to set the points 91*a*, 91*b* and 91*c* in a region in the lower half of the converted image created on the basis of the first finger/palm-print image 81. The points can be set based on position information for the first set of elements and the second set of elements.

Next, the region detecting unit 40 selects a region containing the Nth point within the converted image (step S108). For example, as can be seen by referring to FIG. 7 the region detecting unit 40 first selects selected region 92*a* containing the point 91*a*, secondly selects the selected region 92*b* containing the point 91*b* and thirdly selects the selected region 92*c* containing the point 91*c*.

By selecting prescribed regions within the converted image so that points determined on the basis of the positional relationship between the area 81*a* of the first finger/palm-print image 81 and the area 82*a* of the second finger/palm-print image 82 are included, it is possible to efficiently detect detected regions.

Next, the region detecting unit 40 determines whether the selected region is a detected region on the basis of the number of first set elements contained in the selected region (step S109). Specifically, the region detecting unit 40 determines whether or not the number of pixels corresponding to first set of elements comprising the selected region are 80% or greater of the total number of pixels comprising the converted image. In the example shown in FIG. 6, there are 209 pixels indicated by "1" in the selected region E. In this case, the number of pixels corresponding to the first set of element exceeds 80% of the 256 pixels comprising the selected region E. Accordingly, the region detecting unit 40 determines that the selected region E is a detected region.

When it is determined that the selected region is a detected region, the region detecting unit 40 proceeds to step S110 and sets that selected region as the Xth detected region (step S110). At this time, the region detecting unit 40 creates region detecting information for detecting to which region of the finger/palm-print image that is the original data of the converted image the detected region corresponds, from the position information of the first set of elements and the second set of elements corresponding to the pixels contained in the detected region. Furthermore, this region detecting information is stored as the Xth region detecting information.

The set of elements correspond to one partition when the finger/palm-print image is regularly partitioned, so the correlation between the set of elements and the finger/palm-print image is clear. Consequently, it is possible to detect to what areas of the finger/palm-print image each set of elements corresponds from the position information of the first set of elements and the second set of elements. Accordingly, the region detecting unit 40 can create the region detecting information.

When the image converting unit 30 and the like create a converted image by deleting detected areas when converting the finger/palm-print image into the converted image, the region detecting unit 40 creates region detecting information on the basis of region-corresponding information for the converted image. This region-corresponding information is information for detecting to what region of the finger/palm-print image the first set of elements and the second set of elements correspond. Consequently, through the region detecting information, it is possible to detect to which regions of the finger/palm-print image the first set of elements and the second set of elements corresponding to the detected region apply.

The region detecting unit 40 retains the created region detecting information as the Xth region detecting information. The region detecting unit 40 passes the region detecting information to the comparison unit 50 or successively accumulates and retains the region detecting information until the finger/palm-print image processing apparatus 100 concludes the process.

When the region detecting unit 40 retains the Xth region detecting information, a determination is made as to whether X is a prescribed value (step S111). When X is the prescribed value (step S111: Yes), the unit proceeds to step S117. When this occurs, the region detecting unit 40 passes the Xth region detecting information to the comparison unit 50. X being the prescribed value means that the number of detected regions necessary for use in comparison of finger/palm-prints can be detected.

Here, because comparison of finger/palm-prints is being accomplished using three regions in the finger/palm-print images, the prescribed value is 3. When X is less than the prescribed value (step S111: No), the unit proceeds to step S112.

The region detecting unit 40 in step S112 increments the value of X by 1 (X=X+1) and then proceeds to step S113. In other words, after detecting the Xth detected region, the region detecting unit 40 further searchers for the X+1$^{st}$ detected region. In addition, the region detecting unit 40 in step S113 increments the value of N by 1 (N=N+1) and then returns to step S105. Following this, a selected region centered on the N+1$^{st}$ point out of the aforementioned points is selected.

When the determination in step S109 is negative, the region detecting unit 40 determines whether M is a prescribed value (step S114). When M is the prescribed value (step S114: Yes), the region detecting unit 40 proceeds to step S113 on the assumption that all of the surroundings of the points set in step S107 have been selected. Here, the prescribed value is 9. The region detecting unit 40 in step S113 increments the value of N by 1 (N=N+1) and then returns to step S105. Following this, the selected region centered on the N+1$^{st}$ point is selected.

When M is less than the prescribed value (step S114: No), the region detecting unit 40 proceeds to step S115 on the assumption that all of the surroundings of the points set in step S107 have not been selected. The region detecting unit 40 in step S115 selects the region at the position corresponding to M for the Nth point (step S115).

Next, the region detecting unit 40 proceeds to step S116, increments the value of M by 1 and then returns to step S109. When the determination in step S109 is negative, the region detecting unit 40 proceeds to step S114. In this manner, the region detecting unit 40 repeatedly selects regions surrounding points set in step S107 until the detected regions are detected or until all of the regions surrounding the points set in step S107 have been selected.

The region surrounding a point is the region such that the center of that region is within a fixed distance from that point. Consequently, the region surrounding this point may be a region containing this point or may be a region not containing this point.

Figure 8A:
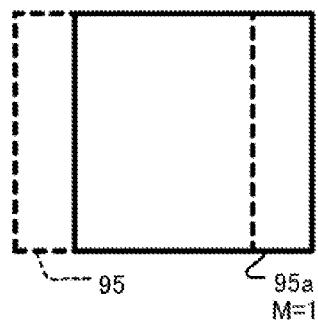
FIG. 8A is a diagram showing one example of a first selected region when the surroundings of the set point are selected.
Figure 8E:
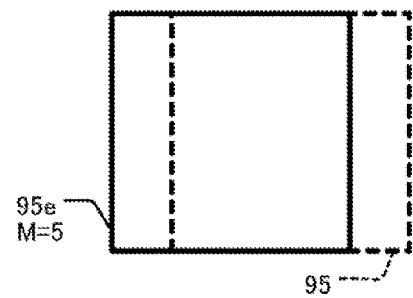
FIG. 8E is a diagram showing one example of a fifth selected region when the surroundings of the set point are selected.
Figure 8B:
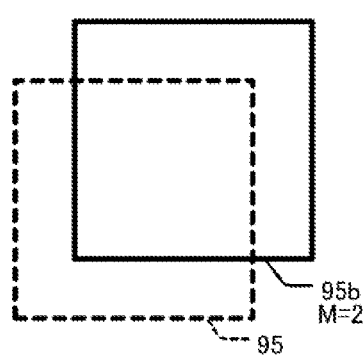
FIG. 8B is a diagram showing one example of a second selected region when the surroundings of the set point are selected.
Figure 8F:
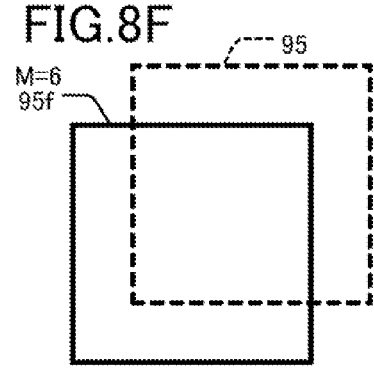
FIG. 8F is a diagram showing one example of a sixth selected region when the surroundings of the set point are selected.
Figure 8C:
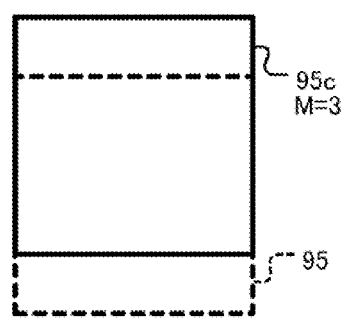
FIG. 8C is a diagram showing one example of a third selected region when the surroundings of the set point are selected.
Figure 8G:
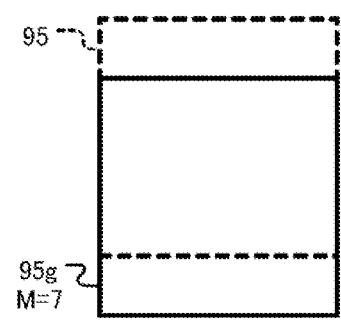
FIG. 8G is a diagram showing one example of a seventh selected region when the surroundings of the set point are selected.
Figure 8D:
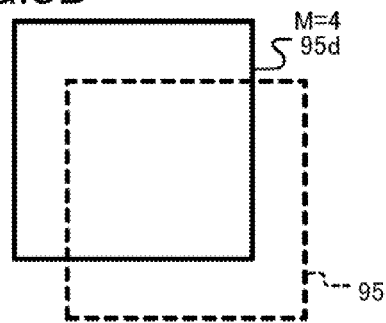
FIG. 8D is a diagram showing one example of a fourth selected region when the surroundings of the set point are selected.
Figure 8H:
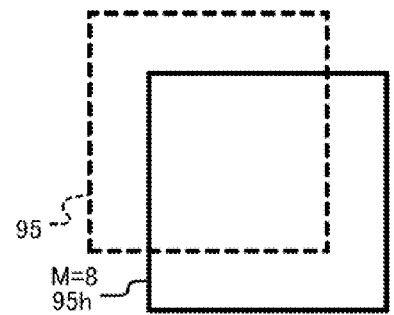
FIG. 8H is a diagram showing one example of an eighth selected region when the surroundings of the set point are selected.

FIG. 8A shows one example of a first selected region when selecting the surroundings of the set points. FIG. 8B shows one example of a second selected region when selecting the surroundings of the set points. FIG. 8C shows one example of a third selected region when selecting the surroundings of the set points. FIG. 8D shows one example of a fourth selected region when selecting the surroundings of the set points. FIG. 8E shows one example of a fifth selected region when selecting the surroundings of the set points. FIG. 8F shows one example of a sixth selected region when selecting the surroundings of the set points. FIG. 8G shows one example of a seventh selected region when selecting the surroundings of the set points. FIG. 8H shows one example of an eighth selected region when selecting the surroundings of the set points.

FIGS. 8A through 8H show the selected regions for points set to the first (N=1). That is to say, the region 95 surrounded by the dotted line corresponds to the selected region 92*a* in FIG. 7.

When M is 1, the region detecting unit 40 prescribes a region 95*a* at a position four pixels to the right from the region 95, as shown in FIG. 8A. Furthermore, the region 95*a* is selected as a selected region. In addition, when M is 2, the region detecting unit 40 prescribes a region 95*b* at a position four pixels up from the region 95*a*, as shown in FIG. 8B. Through this, the region 95*b* is prescribed at a position four pixels to the right and four pixels up from the region 95. Furthermore, the region 95*b* is selected as a selected region. In addition, when M is 3, the region detecting unit 40 prescribes a region 95*c* at a position four pixels to the left from the region 95*b*, as shown in FIG. 8C. Through this, the region 95*c* is prescribed at a position four pixels up from the region 95. Furthermore, the region 95*c* is selected as a selected region.

From there, the region detecting unit 40 prescribes regions 95*d* through 95*h* at positions deviating by four pixels in the vertical or horizontal direction from the selected region prescribed most recently, as shown in FIGS. 8D through 8H. Furthermore, the prescribed regions 95*d* through 95*h* are successively selected. In this manner, the region detecting unit 40 successively prescribes regions corresponding to M with the point set in step S107 as the standard. Furthermore, these are selected as selected regions. The regions corresponding to M are preset.

The region detecting unit 40 successively prescribes selected regions surrounding the point set in step S107 as described above until the detected region is detected.

Figure 9A:
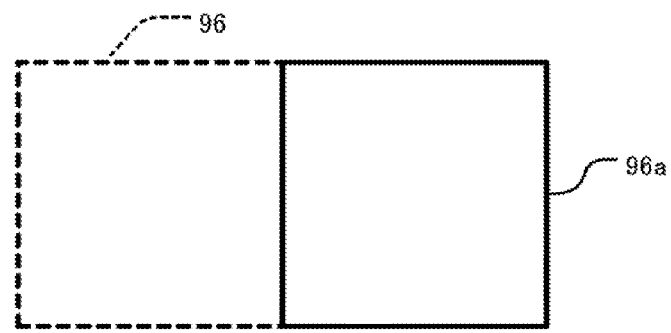
FIG. 9A is a diagram showing one example of a first selected region when the surroundings of the set point are selected.
Figure 9B:
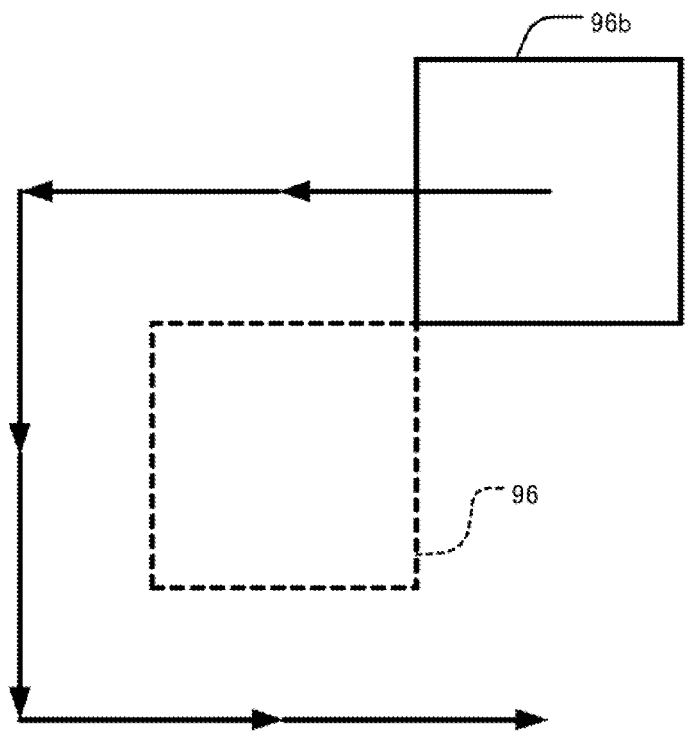
FIG. 9B is a diagram showing one example of a second selected region when the surroundings of the set point are selected.

FIG. 9A shows one example of a first selection region when the surroundings of the set point are selected. FIG. 9B shows one example of a second selection region when the surroundings of the set point are selected.

As shown in FIG. 9, the region detecting unit 40 detects regions so that the region detected before and the region detected after do not overlap, and may select these regions as selected regions. In this case, it is possible to efficiently detect the detected regions. The region selected one before is not a detected region and thus contains large numbers of second set elements. When there is an area in which the prescribed regions overlap each other, the region selected after may also contain large numbers of second set elements. Accordingly, the regions may be prescribed so as to not mutually overlap.

In FIG. 9, a region 96 is a selected region selected so as to include the point set in step S107. A region 96*a* in FIG. 9A is a selected region selected when M is 1. A region 96*b* in FIG. 96B is a selected region selected when M is 2. The arrow in FIG. 9B shows the transition in the center of the region selected when M is 3 or greater.

In FIGS. 8 and 9 the region detecting unit 40 selected as selected regions eight regions that are up, down, left right and in a diagonal direction between those as viewed from the point. The region detecting unit 40 may detect only a region in the up, down, left or right directions, or only a region in a diagonal direction as viewed from the point.

In addition, the region detecting unit 40 continues to select regions surrounding the point only when the third region cannot be detected. However, the region detecting unit 40 may continue to select regions surrounding the point until M reaches a prescribed value, even when the third region is found. In this case, it is preferable for the region detecting unit 40 to select regions so that the region selected before and the region selected after to not overlap each other, as illustrated in FIG. 9. In addition, it is preferable to select regions such that even if the region selected before and the region selected after overlap each other, only the regions within a prescribed range overlap. When large portions of the detected regions overlap each other, multiple comparison target regions are used in comparing finger/palm-prints. As a result, the accuracy of finger/palm-print comparison deteriorates.

As can be seen by referring to FIGS. 8 and 9, the region detecting unit 40 makes selections in sequence from a region near the center of the converted image, when selecting a series of regions surrounding the point set in step S107 (see also the arrows in FIG. 7). The outside of the finger/palm-print image is a region where the finger/palm-print is not photographed or is an area where comparison of finger/palm-prints is difficult. Consequently, if selections are made from regions near the outside of the converted image, efficiency deteriorates when detecting detected regions.

As shown in FIGS. 8 and 9, the region detecting unit 40 first selects regions near the center of the converted image when selecting a series of regions surrounding the point set in step S107. Furthermore, regions are successively selected about this point, with this region as a reference point. Through this, it is possible to efficiently detect the detected regions.

FIG. 10 is a drawing for explaining the transition in regions successively stipulated so as to encompass the surroundings of the point. The arrow illustrated in FIG. 10 indicates the transition of the stipulated regions. As shown in FIG. 10, the region detecting unit 40 selects a region in the center (here, the right side) of the converted image 97 when a point 97*b* exists in the region on the left side of the converted image 97. Following this, the selected regions are successively selected in a counterclockwise direction from the selected region most recently selected.

On the other hand, the region detecting unit 40 selects a region in the center (here, the left side) of the converted image 97 when a point 97*d* exists in the region on the right side of the converted image 97. Following this, the selected regions are successively selected in a clockwise direction from the selected region most recently selected. In this manner, when the selected regions are selected, it is possible to efficiently detect the detected regions.

As noted above, the region detecting unit 40 selects as the selected region a region that is a portion of the converted image. Next, a determination is made as to whether or not the selected region contains at least a prescribed number of first set elements. Furthermore, a selected region is detected as a detected region only when the selected region contains at least a prescribed number of first set elements. The region detecting unit 40 repeats the above-described operation until a fixed number of prescribed regions containing at least a prescribed number of first set elements have been detected. Through this, it is possible to detect a prescribed number of finger/palm-print comparison target regions. Accordingly, it is possible increase the accuracy of finger/palm-print comparison.

In step S117, the comparison unit 50 acquires X (three) units of region detecting information from the region detecting unit 40. In addition, the comparison unit 50 acquires the first finger/palm-print image 81, the second finger/palm-print image 82 and the passed information from the image acquiring unit 20. The comparison unit 50 detects the finger/palm-print image that is the original data for the converted image from the passed information. Furthermore, three regions corresponding to the detected regions are acquired from the first finger/palm-print image 81 as comparison images using the region detecting information.

Next, the comparison unit 50 compares the three comparison images and the second finger/palm-print image 82 and generates comparison results (step S117). The way of comparing can be accomplished through a commonly known method such as a method using characteristic points. Specifically, the comparison unit 50 compares the second finger/palm-print image 82 and each of the three comparison target regions. Furthermore, the comparison unit tries to extract areas in which characteristics points or the like match with the comparison target regions from the second finger/palm-print image 82.

When an area that matches any of the comparison target regions has been extracted, the comparison unit 50 determines that the owner of the finger/palm-print photographed in the first finger/palm-print image 81 and the owner of the finger/palm-print photographed in the second finger/palm-print image 82 are the same individual. On the other hand, when no areas matching any of the comparison target regions can be extracted, the comparison unit 50 determines that the owner of the finger/palm-print photographed in the first finger/palm-print image 81 and the owner of the finger/palm-print photographed in the second finger/palm-print image 82 are different individuals.

When the process in step S117 is concluded, or when information indicating specification impossibility generated when a negative result is returned in step S106 is acquired from the region detecting unit 40, the comparison unit 50 causes information indicating the comparison results or the fact that comparison is impossible to be displayed on the display unit 60.

Figure 11:
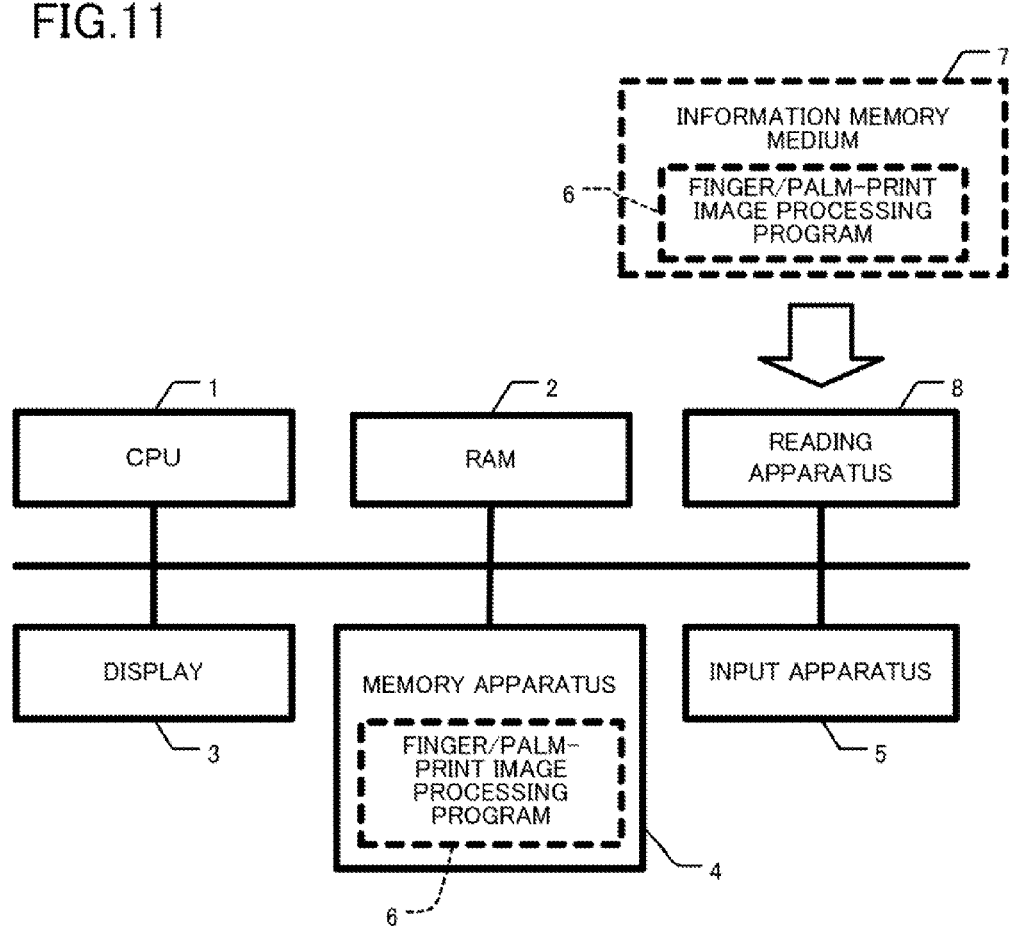
FIG. 11 is a diagram showing the hardware composition of a finger/palm-print image processing apparatus according to an embodiment of the present invention.

FIG. 11 shows the hardware composition of a finger/palm-print image processing apparatus according to an embodiment of the present invention. The input unit 10 in FIG. 1 is composed of an input device 5 such as a keyboard and mouse. The image acquiring unit 20 in FIG. 1 is composed of the image acquiring unit 20, the image converting unit 30, the region detecting unit 40, the comparison unit 50, the CPU 1, the calculation region of the RAM 2, and the memory region in the memory apparatus 4 that stores data and the like generated by the CPU 1 during processing. The memory unit 70 in FIG. 1 is composed of a prescribed memory region in the memory apparatus 4. The display unit 60 in FIG. 1 is composed of the display apparatus 3. In addition, the finger/palm-print image processing program 6 is installed using a reading apparatus 8 for a CD-ROM drive or the like and a portable information memory medium 7 such as a CD-ROM on which the finger/palm-print image processing program 6 is stored. Or, this is downloaded via a network. In addition, the finger/palm-print image processing program 6 may be stored in advance on a ROM (Read Only Memory) comprising the memory apparatus 4. The finger/palm-print image processing program 6 is developed in the RAM 2. The memory medium on which the finger/palm-print image processing program 6 is recorded, such as the RAM 2, ROM, the memory apparatus 4 or the portable information memory medium 7 or the like, is a finger/palm-print image processing program product.

As explained above, with the present embodiment the image converting unit 30 converts a finger/palm-print image composed of 1,024×1,024 pixels into a convened image composed of 64×64 pixels (set of elements) composed of first set elements and second set elements partitioned in a predetermined size. Through this, the volume of data handled when accomplishing comparisons is reduced, easing the burden of processing in detecting detected regions.

The preferred embodiment of the present invention is explained above, but the present invention is not limited by the above-described embodiment. For example, the image acquiring unit 20, the image converting unit 30, the region detecting unit 40 and the comparison unit 50 may also be comprised by combinations of two or more CPUs (central processing units) and two or more memory regions. In this case, the memory regions are composed of memory regions in RAM (Random Access Memory) or the like, for example, and memory regions in memory apparatuses holding data each unit creates during processing. The display unit 60 may be composed of a display apparatus such as a display or the like. The memory unit 70 may be composed of specified memory regions in one or more memory apparatuses, for example. Flash memory and a hard disc are examples of memory apparatuses.

In addition, the finger/palm-print image processing apparatus 100 may comprise two or more computers, for example. The processes accomplished by the finger/palm-print image processing apparatus 100 may also be dispersed processes on multiple apparatuses. In this case, the multiple apparatuses as a whole become the finger/palm-print image processing apparatus 100. In addition, the memory unit 70 may be provided on a server or the like. That is to say, the memory unit 70 may be external to the finger/palm-print image processing apparatus 100.

In addition, in the above-described embodiment the image acquiring unit 20 acquired finger/palm-print images from the memory unit 70. This is not limiting, for the finger/palm-print images may be acquired via a finger/palm-print reading apparatus that reads finger/palm-print images, for example. In addition, signed finger/palm-prints or finger/palm-prints remaining at crime scenes or the like may be turned into electronic data as finger/palm-print images.

In addition, when the finger/palm-print images are partitioned into predetermined sizes and the partitioned regions are made to be sets of elements, it can be understood from the position of the sets of elements in the converted image which detected regions contained in these correspond to which regions of the finger/palm-print image. Hence, the region detecting unit 40 may generate region detecting information from position information for the first set of elements and the second set of elements contained in the detected region.

In addition, in the above-described embodiment the image acquiring unit 20 selected the first finger/palm-print image 81 from between the first finger/palm-print image 81 and the second finger/palm-print image 82. This is not limiting, for the second finger/palm-print image 82 may be selected as well. In addition, selection of the finger/palm-print image may be accomplished by the user via the input unit 10.

In addition, in the above-described embodiment the sets of elements are comprised of 16×16 pixels. This is not limiting, for the sets of elements may be comprised of 12×12, or 8×8, elements.

In addition, in the above-described embodiment the selected region is comprised of 16×16 pixels. This is not limiting, for the sets of elements may be comprised of 12×12, or 8×8, elements.

Multiple points may also be unevenly distributed in a region in which a region where the detected region is readily detected can be grasped through prior experience. In this case, the memory unit 70 records information by correlating in advance the type-detecting information and the point-detecting information detecting the positions of the points. The region detecting unit 40 acquires point-detecting information with type-detecting information contained in the converted image as the key, and sets the points based on this point-detecting information. When the points are scattered, it is possible to search detected regions thoroughly within the converted image.

In the above-described embodiment, the selected region is stipulated so as to transition four pixels at a time. This is not limiting, for the selection region may be stipulated so as to transition one pixel or two pixels at a time. In addition, the selected region may be stipulated so as to transition by more than four pixels.

However, when the displacement becomes too large, there are cases in which the selected region overlaps in part or in whole the select region when the surroundings of other points are selected. For example, when the displacement becomes too large, a large part of the selected region shifted to the right from the selected region 92a and the selected region shifted to the left from the selected region 92b overlap, as can be seen by referring to FIG. 7. In such a case, there is a possibility that two detected regions large parts of which overlap could be detected. Hence, it is preferable for this displacement to be small to a certain degree. Even if overlapping of the selected regions occurs, when the overlapping area is small it is possible to accomplish comparison of finger/palm-prints without problems.

On the other hand, when the displacement is too small, there is a possibility that the detected regions cannot be detected efficiently. That is because the area where the region selected one before and the region selected one after overlap becomes large. The region selected one before is not a detected region and thus contains large numbers of second set elements. When the overlap area is large, the region selected after may also contain large numbers of second set elements The image converting unit 30 may generate conversion information by deleting a prescribed area (unnecessary area), for example the finger area, when converting the finger/palm-print image into the converted image. For example, the region other than the area 81a is deleted from the first finger/palm-print image. In this case, the image converting unit 30 links to the converted image region-corresponding information that is information that can detect to which region of the finger/palm-print image the first set of elements and the second set of elements correspond. This region-corresponding information can be generated from position information for the pixels included in the gradation information or the finger/palm-print image.

Deleting this prescribed area may be accomplished by something other than the image converting unit 30 also. In other words, deleting this prescribed area may be accomplished by an unrepresented unnecessary area deleting unit provided between the image acquiring unit 20 and the image converting unit 30.

In addition, when the finger area is not used in comparing finger/palm-prints, the area corresponding to the finger area may be detected from the value of the color information (gradation) or the degree of change (contrast) in color information. When areas in which there is no change (or very little change) in the color information or the degree of change of the color information and areas in which there is change (or large change) in the color information or degree of change in the color information are lined up alternately in a belt shape, these areas can be predicted to correspond to the finger area. The areas in which there is no change (or very little change) in the color information or the degree of change of the color information are considered to be areas where the spaces between fingers are photographed. The areas in which there is change (or large change) in the color information or degree of change in the color information are considered to be regions where the fingers are photographed.

When the first finger/palm-print image 81 is converted into a converted image and a prescribed area (unnecessary area) is deleted in accordance with prescribed conditions, the burden of processing is eased.

In addition, information relating to the finger/palm-print image includes position information and color information (gradation) for each pixel, owner-detecting information detecting the owner of the finger/palm-print of the finger/palm-print image, and type-detecting information detecting the type of the finger/palm-print. The owner-detecting information is information relating to the name of the owner, and the type-detecting information is information detecting the type of finger/palm-print.

In addition, when the two finger/palm-print images selected by the user are images which are impossible to compare, the image acquiring unit 20 may cause the fact that comparison is not possible to be displayed on the display unit 60. The determination of whether or not comparison is possible can be accomplished on the basis of the type-detecting information.

In this case, the image acquiring unit 20 acquires from the memory unit 70 information relating to combinations of comparable finger/palm-print images recorded in advance in the memory unit 70. Next, a determination of whether the two finger/palm-print images detected from the type-detecting information are comparable is made on the basis of the acquired information. Next, the image acquiring unit 20 starts the image process when the determination is that the two finger/palm-print images detected from the type-detecting information can be compared. On the other hand, when the determination is that the two finger/palm-print images detected from the type-detecting information cannot be compared, the image acquiring unit 20 causes information about the fact that comparison is impossible to be displayed on the display unit 60 and the image process concludes.

The present application is the National Phase of PCT/JP2009/071348, filed Dec. 22, 2009, which is based on Japanese Patent Application No. 2008-325120, filed on Dec. 22, 2008, the entire disclosure of which is incorporated by reference herein.

INDUSTRIAL APPLICABILITY

The finger/palm-print image processing apparatus, the finger/palm-print image processing method and the recording medium for recording a finger/palm-print image processing program according to the present invention are suitable for comparing finger/palm-print images.

DESCRIPTION OF REFERENCE SYMBOLS

1 CPU
3 display apparatus
4 memory apparatus
5 input apparatus
6 finger/palm-print image processing program
7 data storage medium
8 reading apparatus
10 input unit
16 rows
20 image acquiring unit
30 image converting unit
40 region detecting unit
50 comparison unit
60 display unit
70 memory unit
81 first finger/palm-print image
81a area
82 second finger/palm-print image
82a area
90 converted image
91, 91a, 91b, 91c point
92a, 92b, 92c selected region
95 region
95a to 95h region
96 region
96a region
96b region
97 converted image
97b point
97d point
100 finger/palm-print image processing apparatus
A pixel
B set of elements
C pixel
D pixel
E selected region

The invention claimed is:

1. A finger/palm-print image processing apparatus for processing a finger/palm-print image that is an image of a finger/palm-print, the finger/palm-print image processing apparatus comprising:
   an image converting unit for converting the finger/palm-print image into a converted image having sets in which elements of the finger/palm-print image are gathered and comprising a first set of elements in which the degree of change in color information in the elements within the set of elements satisfy a predetermined criterion, and a second set of elements in which the degree of change in color information in the elements within the set of elements do not satisfy a predetermined criterion; and
   a region detecting unit for selecting a region that is a part of the converted image converted by the image converting unit, determining whether or not a selected region that is the region that was selected contains at least a prescribed number of the first set of elements, and detecting the selected region as a region with at least a prescribed number of the first set of elements only when at least the prescribed number are contained;
   wherein the region detecting unit selects a region on the right side of the selected region as a second selected region when the selected region is on the left side of the converted image, and from there reselects regions surrounding the selected regions until a predetermined number of regions containing at least a predetermined number of the first set of elements is detected in a counterclockwise direction; and
   selects a region on the left side of the selected region as a second selected region when the selected region is on the right side of the converted image, and from there reselects regions surrounding the selected regions until a predetermined number of regions containing at least a predetermined number of the first set of elements is detected in a clockwise direction.

2. The finger/palm-print image processing apparatus according to claim 1, wherein the region detecting unit selects a region that is part of the converted image by selecting a region containing one of multiple points set respectively in multiple prescribed positions mutually separated within the converted image.

3. The finger/palm-print image processing apparatus according to claim 2, wherein the region detecting unit selects a region in a position on the inside of the finger/palm-print image from the point when reselecting a region that is part of the converted image.

4. The finger/palm-print image processing apparatus according to claim 2, wherein the region detecting unit selects a region in a position on the inside of the finger/palm-print image from the point when reselecting a region that is part of the converted image, and from that initially reselects the region so as to encompass the surroundings of the point in a direction facing the inside of the finger/palm-print image.

5. The finger/palm-print image processing apparatus according to claim 2, wherein the multiple points are set within a prescribed range in the converted image.

6. A finger/palm-print image processing method for processing a finger/palm-print image that is an image of a finger/palm-print, including the following steps:
   converting the finger/palm-print image into a converted image having sets in which elements of the finger/palm-print image are gathered and comprising a first set of elements in which the degree of change in color information in the elements within the set of elements satisfy a predetermined criterion, and a second set of elements in which the degree of change in color information in the elements within the set of elements do not satisfy a predetermined criterion; and
   selecting a region that is a part of the converted image, determining whether or not a selected region that is the region that was selected contains at least a prescribed number of the first set of elements, and detecting the selected region as a region with at least a prescribed number of the first set of elements only when at least the prescribed number are contained;
   a region on the right side of the selected region is selected as a second selected region when the selected region is on the left side of the converted image, and from there regions surrounding the selected regions are reselected until a predetermined number of regions containing at least a predetermined number of the first set of elements is detected in a counterclockwise direction; and
   a region on the left side of the selected region is selected as a second selected region when the selected region is on the right side of the converted image, and from there regions surrounding the selected regions are reselected until a predetermined number of regions containing at least a predetermined number of the first set of elements is detected in a clockwise direction.

7. A non-transitory recording medium on which is recorded a finger/palm-print image processing program for accomplishing on a computer a finger/palm-print image processing method for processing a finger/palm-print image that is an image of a finger/palm-print, wherein the recording medium records a finger/palm-print image processing program comprising:

- an image converting step for converting the finger/palm-print image into a converted image having sets in which elements of the finger/palm-print image are gathered and comprising a first set of elements in which the degree of change in color information in the elements within the set of elements satisfy a predetermined criterion, and a second set of elements in which the degree of change in color information in the elements within the set of elements do not satisfy a predetermined criterion; and
- a region detecting step for selecting a region that is a part of the converted image converted by the image converting step, determining whether or not a selected region that is the region that was selected contains at least a prescribed number of the first set of elements, and detecting the selected region as a region with at least a prescribed number of the first set of elements only when at least the prescribed number are contained;
- wherein the region detecting step a region on the right side of the selected region is selected as a second selected region when the selected region is on the left side of the converted image, and from there regions surrounding the selected regions are reselected until a predetermined number of regions containing at least a predetermined number of the first set of elements is detected in a counterclockwise direction; and
- a region on the left side of the selected region is selected as a second selected region when the selected region is on the right side of the converted image, and from there regions surrounding the selected regions are reselected until a predetermined number of regions containing at least a predetermined number of the first set of elements is detected in a clockwise direction.

* * * * *